United States Patent [19]
Fuehrer et al.

[11] 4,111,530
[45] Sep. 5, 1978

[54] MICROSCOPE OBJECTIVE MOUNT

[75] Inventors: Werner Fuehrer; Richard Huttel, both of Ehringshausen; Robert Lisfeld, Ulm, all of Fed. Rep. of Germany; Karl Leonhardt, deceased, late of Greifenthal, Fed. Rep. of Germany, by Herta Leonhardt, administratrix

[73] Assignee: Ernst Leitz Wetzlar GmbH, Wetzlar, Fed. Rep. of Germany

[21] Appl. No.: 747,176

[22] Filed: Dec. 3, 1976

[30] Foreign Application Priority Data

Dec. 5, 1975 [DE] Fed. Rep. of Germany ....... 2554749

[51] Int. Cl.² .................. G02B 7/02; F16L 27/08; F16L 21/04
[52] U.S. Cl. .................................. 350/252; 285/321; 285/DIG. 22; 350/321
[58] Field of Search .................. 350/252, 254, 38–39, 350/175 ML, 178, 320–321, 257; 403/203; 285/305, 321, 276, DIG. 22

[56] References Cited

U.S. PATENT DOCUMENTS

3,243,206   3/1966   Samer .................. 285/DIG. 22
3,447,819   6/1969   Borsum et al. .................. 285/321

FOREIGN PATENT DOCUMENTS

917,193   1/1963   United Kingdom .................. 285/321

OTHER PUBLICATIONS

Leitz, E., Abstract of German Utility Model No. 1993231, 9-5-68.

Primary Examiner—John K. Corbin
Assistant Examiner—Wm. H. Punter
Attorney, Agent, or Firm—Bacon & Thomas

[57] ABSTRACT

A novel and advantageous microscope objective mount is provided. Said mount can be screwed to a microscope and more particularly to the objective turret or nosepiece. It is provided with a rotatable outer sleeve held on the mount, the sleeve being held by an elastically deformable ring which engages, at least in part, by force-locking. Due to the construction of the mount of this invention, attachment of the sleeve thereto is considerably facilitated and improved with respect to the axial play as compared with known mount assemblies. There is practically no radial clamping of the holding ring against the mount.

10 Claims, 7 Drawing Figures

MICROSCOPE OBJECTIVE MOUNT

BACKGROUND OF THE INVENTION

1. Field of the Invention

The present invention relates to a novel and advantageous microscope objective mount which can be screwed to a microscope and more particularly to the objective turret or nosepiece and has a rotatable outer sleeve held on the mount, the sleeve being held by an elastically deformable ring which engages, at least in part, by forcelocking.

2. Description of the Prior Art

Replaceable microscope objectives are provided with legends on their mounts in order to identify them, these legends indicating the optical data of the objective. When the objective is screwed in place, these legends are frequently outside the field of view of the person using the microscope. Therefore, German Utility Model No. 1,993,231 describes a rotatable legend sleeve with which the date on the objective can be turned into the field of view of the user. The sleeve is held in this known arrangement either by means of a cap which is screwed thereon or by a retainer ring which engages in annular grooves which are provided in the mount and sleeve.

Another method of making the marking of the specific objective visible in every position in which it is screwed consists in using an annular color code arranged on the mount, for the optical data. The disadvantage of this solution, however, is that the code must be decoded by means of a suitable list, unless the user has memorized the code. Furthermore, no standard code has been adopted as yet by the different microscope manufacturers.

SUMMARY OF THE INVENTION

It is one object of the present invention to provide a microscope objective mount having a rotatable outer sleeve in which the possibilities of mounting and attaching the rotatable sleeve are facilitated as compared with the known arrangement and improved with respect to the axial play. The manipulations upon replacement of the lens are greatly facilitated by a special arrangement of said sleeve. In addition, a simple additional color marking is to be made possible by the new manner of attachment.

Other objects of the present invention and advantageous features thereof will become apparent as the description proceeds.

In principle this object of the present invention is achieved with a microscope objective mount of the aforementioned type by providing the sleeve and ring with protrusions and recesses which engage with each other so that in their engaged position at least portions of the annular region which is covered by this sleeve are pressed by elastic deformation into an annular groove provided in the mount. As a result thereof the ring in its operative position rests in axial direction, on the one hand, against a collar arranged on the mount and, on the other hand, in the region of the force-locked engagement in the sleeve, against the wall of the annular groove which is opposite the collar. In this connection, a cylindrical ring which is elastically deformable radially within the region of the force-locked engagement can be provided. A slit ring which is deformable elastically in radial and axial direction can also be provided.

The protrusions and recesses can be developed as annular beads and annular grooves. It is advantageous for the ring to be provided solely in the overlap region with at least one slit extending in axial direction.

The collar arranged on the mount can be formed by the shoulder of a knurled ring. For changing of the objective it is particularly advantageous for the sleeve to be arranged between the threaded portion for screwing of the objective into the microscope and the knurled ring. The ring for holding of the sleeve may consist of plastic material. It can be visible in the extension of the sleeve which surrounds it, and can be colored, at least in its visible region.

The support for the rotatable sleeve in accordance with the present invention is free of play in axial direction since, on the one hand, there is a force-locked connection between the sleeve and the support and, on the other hand, the holding ring rests against the support on two surfaces which are axially opposite each other. The resting surfaces of the mount are very small. There is practically no radial clamping of the holding ring against the mount. The frictional forces of the holding ring with respect to the mount, therefore, are correspondingly small, so that easy rotation of the sleeve is assured. This is important in order to prevent accidental loosening of the microscope objective after it has been screwed in place.

The mounting in accordance with the present invention affords also considerable advantages with respect to its assembly. It is merely necessry to push the holding ring over the mount. It will initially place itself on the collar arranged on the mount. The sleeve, which is then pushed on, automatically slides over the holding ring, presses the latter, at least in part, into the annular groove provided in the mount and engages at the place intended therefor, so as to form a force-locked connection with the ring. Special assembly tools, for instance, for compressing a retainer ring, are dispensed with. The manner of force-locked engagement in itself is not an object of the present invention. It is known, for instance, from German Published Application No. 1,928,861.

BRIEF DESCRIPTION OF THE DRAWING

Illustrative embodiments of the present invention and its advantages will be described hereinafter by way of examples in the accompanying diagrammatical drawings in which.

DESCRIPTION OF THE PREFERRED EMBODIMENTS

Figure 1:
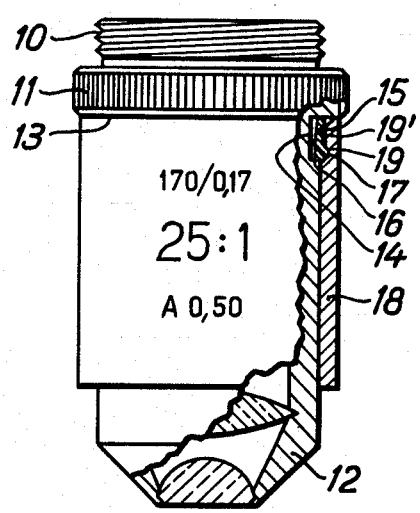
FIG. 1 is a side view of a microscope objective with the mount partially cut away.

The microscope objective mount 12 shown in FIG. 1 is provided on its upper end with a thread 10 by which it can be screwed onto a microscope (not shown) or a microscope turret or nosepiece. In the direct vicinity of thread 10 there is provided knurled ring 11 which is rigidly fastened to thread 10 and mount 12. Adjacent the shoulder 13 of knurled ring 11 facing away from the thread, a shallow annular groove 14 is recessed in mount 12. It is of particular advantage that the new mounting requires only a shallow groove since the wall thicknesses of microscope objective mounts are generally very slight. Any deeper recess such as, for instance, required for a retainer ring, leads to a considerable impairment of the mechanical strength of the mount. Sleeve 18 is turnably held on mount 12 by ring 15 which engages into annular groove 14.

Figure 2:
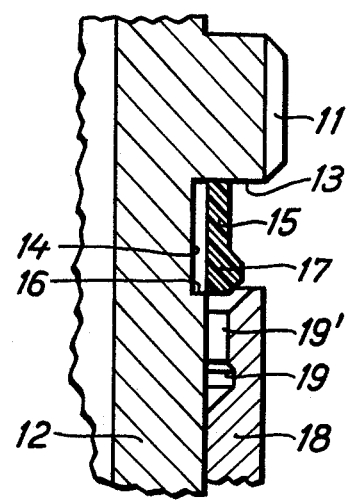
FIG. 2 is a fragmentary enlargement of the region in which the rotatable sleeve is held.

Further details of the mounting can be noted from FIG. 2. An elastically deformable cylindrical ring 15 is pushed over mount 12. The width of ring 15 corresponds to the distance between the collar formed on mount 12 by the shoulder 13 of knurled ring 11, and the wall 16 of annular groove 14 opposite said collar. Due to the elastic deformability of ring 15, the width thereof, however, need be maintained only withina certain range of tolerances. This is advantageous in manufacture. In the region of wall 16, ring 15 is provided with a conical, outwardly directed bead 17.

A sleeve 18 which is also pushed over mount 12 is provided with a recessed shoulder 19 at the end of said sleeve which is first pushed over ring 15 and is beveled in order to facilitate pushing thereof over ring 15. In this connection, ring 15 is pushed partially into groove 14. Sleeve 18 is furthermore provided in the region of recessed shoulder 19 with a groove 19 in which the bead 17 of ring 15 can engage. The depth of this groove 19 is selected so that, even in engaged condition, ring 15 still remains pressed in the region of wall 16 into annular groove 14. Ring 15 then rests on collar 13 and surface 16, as can be noted from FIG. 3.

Figure 3:
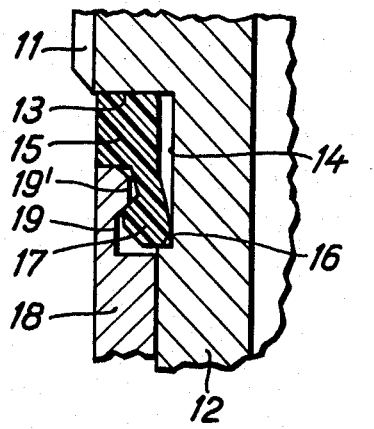
FIG. 3 is a fragmentary enlargement of a mounting of the sleeve with partially visible holding ring.
Figure 7:
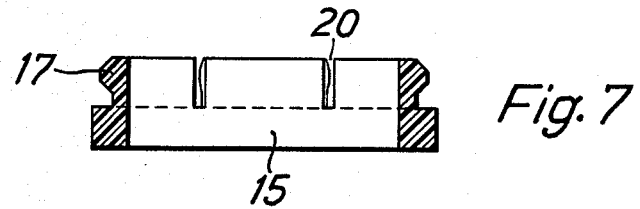
FIG. 7 illustrates a holding ring according to FIG. 3 but with axially extending slits in the region of overlap.

In the embodiment shown in FIG. 3, ring 15 and sleeve 18 are in force-locked or spring-locked engagement. In the region of the force-locked engagement sleeve 18 overlaps ring 15 and presses it resiliently in this region into groove 14. In order to facilitate the elastic deformation required for this purpose, ring 15 is provided in the region of overlap preferably with three longitudinal slits 20 (see FIG. 7) uniformly divided over the circumference.

In this embodiment, ring 15 is visible in the extension of sleeve 18. By coloring ring 15 it is thus possible to provide, simultaneously with the mounting of tube 18, also an additional color code on the mount. Ring 15 is preferably made of a plastic material which has a good elasticity and slidability and can readily be colored.

Figure 4:
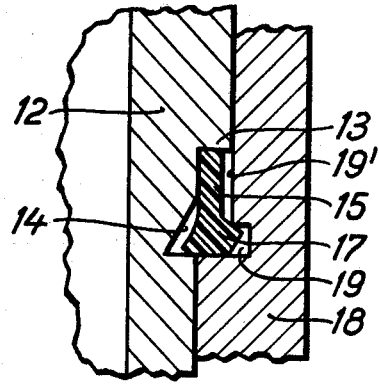
FIG. 4 is a fragmentary enlargement of another embodiment of the mounting of the sleeve in accordance with the present invention.
Figure 6:
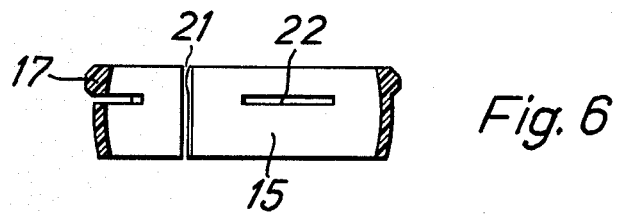
FIG. 6 illustrates a holding ring according to FIG. 2 but with axially and radially extending slits.

FIG. 4 shows another embodiment in which a collar 13 is arranged at any desired place on mount 12, the ring 15 seating itself against said collar. The annular groove 14 provided in mount 12 is stepped down from ring 15 and is developed in the present case in triangularshape. The inside diameter of ring 15 can be equal to the outside diameter of the thinner part of mount 12 and its outside diameter can be equal to that of the thicker part of mount 12. In this connection, ring 15 can also be slit lengthwise, as shown in FIG. 6 by slits 21, in order to facilitate pushing thereof over mount 12. It can also be developed in barrel shape (see FIG. 6). When sleeve 18 is pushed over it, it is automatically compressed to its intended diameter, in which connection it is also pressed inwards between the collar and the supporting surface of the annular groove. Instead of an annular bead 17 on ring 15 a plurality of pips or knobs developed elastically by means of lateral slits 22 can also be distributed over the circumference of ring 15. As seen in FIG. 6, the provision of the lateral slits 22, together with the slit 21, enables the ring 15 to be both axially and radially expandable.

Figure 5:
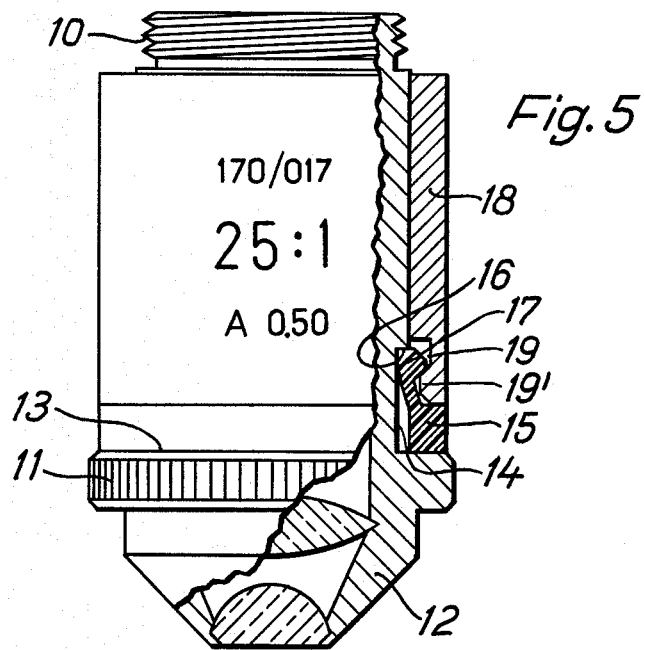
FIG. 5 is a side view of a microscope objective with the mount partially cut away showing a variant of the mounting of the sleeve according to FIG. 3.

In the embodiments of FIGS. 1 to 3, knurled ring 11, one shoulder of which forms collar 13, is arranged directly below the screw thread 10. However, it is also possible for the knurled ring 11 to be arranged at the lower end of the microscope objective mount 12 and the sleeve then to be pushed over the mount from the end of thread 10 (see FIG. 5). This arrangement would have the advantage that, upon change of the objective, the latter could be guided in the rotatable sleeve without the screwing motion exercised via the knurled ring being impeded. Particularly when the objectives are arranged on a turret or nosepiece, in which the screwing points lie very close to each other, this solution is advantageous.

It is evident from the drawings and their description that the present invention is concerned with a microscope objective mount which includes an elongated and generally cylindrical objective mounting element, means at one end of said mounting element for screwably attaching the element to a microscope, a sleeve surrounding said mounting element, and means for rotatably securing said sleeve to said mounting element. Said securing means include a first annular groove in the outside surface of said mounting element and a second annular groove in the inside surface of said sleeve and an elastically deformable ring member interengaging with both of said grooves at least in part in spring-locking relationship. The improvement of such a microscope objective mount according to the present invention comprises the features that the first annular groove comprises two abutment surfaces opposing each other in the axial direction, and the second annular groove further comprises a recessed shoulder. Said elastically deformable ring member further comprises a protrusion adapted for interengagement with said recess upon securing of said sleeve and said mounting element, and said ring member is formed so that it is elastically pressed into said first annular groove in at least a portion of said groove and so that it abuts against both of said abutment surfaces in the region of spring-locking relationship.

It is claimed:

1. In a microscope objective mount including an elongated and generally cylindrical objective mounting element, means at one end of said mounting element for screwably attaching the element to a microscope, a sleeve surrounding said mounting element, and means for rotatably securing said sleeve to said mounting element, said securing means including a first annular groove in the outside surface of said mounting element and a second annular groove in the inside surface of said sleeve and an elastically deformable ring member interengaging with both of said grooves at least in part in spring-locking relationship, wherein the improvement comprises said second annular groove having a shoulder positioned near the axially forward end thereof said shoulder extending toward but being recessed from the mounting element and said shoulder, upon securing of said sleeve and said mounting element in spring-locking relationship, being positioned opposite said first annular groove, whereby said shoulder presses said ring member into said first annular groove and whereby said first annular groove may be made shallow in view of said recessed relationship; axially opposed first and second abutment surfaces on said mounting element for engaging said ring member therebetween, said first abutment surface comprising a shoulder of said first annular groove, and said second abutment surface comprising a collar disposed on said mounting element axially opposite the shoulder of said first annular groove, said collar extending radially from said mounting element; and said ring member having a radially extending protrusion thereon adapted for interengagement with said second annular groove upon securing of said sleeve and said mounting element, said ring member being formed so that it is elastically pressed into said first annular groove by the shoulder of said second annular groove, at least in the region of spring-locking relationship, in axial abutment with the shoulder of said first annular groove and with said collar.

2. The mount according to claim 1, in which said ring member is a cylindrical ring being elastically deformable in radial direction in the region of the spring-locking relationship.

3. The mount according to claim 1, in which said ring member is a slit ring being elastically deformable in radial and axial directions.

4. The mount according to claim 1, in which said protrusion comprises an annular bead.

5. The mount according to claim 1, in which said ring member is provided only in the region overlapped by the sleeve with at least one slit extending in the axial direction.

6. The mount according to claim 1, in which said collar comprises a knurled ring portion attached around the mounting element and wherein said second abutment surface is formed by one axial edge of said knurled ring.

7. The mount according to claim 6, in which the sleeve is arranged between said screwable attachment means and said knurled ring.

8. The mount according to claim 1, in which said ring member consists of plastic material.

9. The mount according to claim 1, in which said ring member extends axially beyond said sleeve, whereby it is visible, and said ring member is colored, at least in the visible region.

10. The mount according to claim 1, in which said first annular groove has a triangular cross-section and said ring member is held between said collar and the shoulder of said triangular groove opposite said collar.

* * * * *